US012790034B2

(12) United States Patent
Reilly et al.

(10) Patent No.: US 12,790,034 B2

(45) Date of Patent: Nov. 10, 2026

(54) SPATIALLY VARIED TUNABLE RADIATOR FOR THERMAL MANAGEMENT

(71) Applicant: ROCKWELL COLLINS, INC., Cedar Rapids, IA (US)

(72) Inventors: Caroline Reilly, Chapel Hill, NC (US); Andrew C. Mcclung, Florence, MA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 75 days.

(21) Appl. No.: 18/941,870

(22) Filed: Nov. 8, 2024

(65) Prior Publication Data

US 2026/0131907 A1 May 14, 2026

(51) Int. Cl.

*B64G 1/50* (2006.01)
*G02B 1/11* (2015.01)
*G02B 3/00* (2006.01)

(52) U.S. Cl.

CPC ................ *B64G 1/503* (2013.01); *G02B 1/11* (2013.01); *G02B 3/0075* (2013.01)

(58) Field of Classification Search

CPC .......... G02B 1/11; G02B 3/0075; B64G 1/00; B64G 1/503

See application file for complete search history.

(56) References Cited

U.S. PATENT DOCUMENTS 3,671,286 A * 6/1972 Fischell .................. B64G 1/50 427/166
4,815,525 A * 3/1989 Readman ............... B64G 1/503 244/172.6
4,832,113 A * 5/1989 Mims ..................... B64G 1/503 165/41
10,133,044 B2 * 11/2018 Amjad .................... F24S 25/60
11,009,297 B2 * 5/2021 Smith .................... B64G 1/503
2012/0266938 A1 10/2012 Goei et al.
2015/0244316 A1 8/2015 Singer et al.
2016/0288928 A1 * 10/2016 Smith .................... B64G 1/506
2017/0222597 A1 8/2017 Behrens et al.
2018/0158966 A1 6/2018 Breen et al.
2022/0073217 A1 * 3/2022 Iverson ................ B64G 1/2224
2024/0255241 A1 * 8/2024 Panas ....................... B64G 1/50
2026/0081635 A1 * 3/2026 Bullock .................. H04B 1/38

FOREIGN PATENT DOCUMENTS

WO WO-9429927 A1 * 12/1994 ............. H01Q 1/288

OTHER PUBLICATIONS

Bikram Bhatia et al. "Passive directional sub-ambient daytime radiative cooling", Nature Communications | (2018) 9:5001 | DOI: 10.1038/s41467-018-07293-9.

* cited by examiner

*Primary Examiner* — Gordon A Jones

(74) *Attorney, Agent, or Firm* — Ross J. Christie; Millen, White, Zelano & Branigan, P.C.

(57) ABSTRACT

A radiator panel of a flight vehicle, comprising: an optomechanical assembly including a lenslet array having at least one movable lens disposed in a first plane; a dielectric disposed in a second plane adjacent the first plane; a backplane disposed in a third plane adjacent the second plane and opposite the first place, the backplane including one or more regions comprising one or more of the following materials: reflective, absorptive, emissive and photovoltaic.

24 Claims, 5 Drawing Sheets

SPATIALLY VARIED TUNABLE RADIATOR FOR THERMAL MANAGEMENT

The subject matter disclosed herein relates to a thermal management assembly and, in particular, to a thermal management assembly for a flight vehicle.

BACKGROUND OF THE INVENTION

Flight vehicles, e.g., satellites, have limited means of thermal management, that is, eliminating heat. The primary method is through radiation. The rejection of heat through radiator panels can involve large area panels, which also have the potential to absorb sunlight. However, the absorption of sunlight by the radiator panels increases the amount of heat that needs to be expelled.

Thus, there exists the need for solutions that decrease the amount of incident solar radiation absorbed by the radiator panels mounted on flight vehicles.

SUMMARY OF THE INVENTION

The present disclosure is directed, in a first aspect, to a radiator panel of a flight vehicle, comprising: an optomechanical assembly including at least one lenslet array having at least one movable lens disposed in a first plane; a dielectric disposed in a second plane adjacent the first plane; a backplane disposed in a third plane adjacent the second plane and opposite the first place, the backplane including one or more regions comprising one or more of the following materials: reflective, absorptive, emissive and photovoltaic.

The present disclosure is directed, in another aspect, to a flight vehicle, comprising: at least one radiator panel comprising: an optomechanical assembly including a lenslet array having at least one movable lens disposed in a first plane; a dielectric disposed in a second plane adjacent the first plane; a backplane disposed in a third plane adjacent the second plane and opposite the first place, the backplane including one or more regions comprising one or more of the following materials: reflective, absorptive, emissive and photovoltaic.

The present disclosure is directed, in yet another aspect, to a process for fabricating a radiator panel of a flight vehicle, comprising the steps of: fabricating at least one backplane; fabricating at least one optomechanical assembly including at least one lenslet array; fabricating at least one radiator panel using the at least one backplane and the at least one optomechanical assembly; and disposing the at least one radiator panel onto at least one exterior surface of a flight vehicle.

In further embodiments of the present disclosure, including further embodiments of the above exemplary embodiments, the at least one lenslet array comprises a piezoelectric transducer configured to move the at least one lenslet array in relation to the backplane.

In further embodiments of the present disclosure, including further embodiments of the above exemplary embodiments, the at least one movable lens comprises one or more controllable lens configured to move individually.

In further embodiments of the present disclosure, including further embodiments of the above exemplary embodiments, the at least one movable lens comprises a controllable array of lens configured to move in plane.

In further embodiments of the present disclosure, including further embodiments of the above exemplary embodiments, the at least one movable lens includes at least one micromechanical structure or at least one actuator, configured to move each lens individually or in plane.

In further embodiments of the present disclosure, including further embodiments of the above exemplary embodiments, one or more regions comprise a metal or at least one coating.

In further embodiments of the present disclosure, including further embodiments of the above exemplary embodiments, the dielectric comprises a vacuum or an inert gas.

In further embodiments of the present disclosure, including further embodiments of the above exemplary embodiments, the at least one movable lens comprises any one or more of the following transparent materials: zinc sulfide, zinc selenide, fluoride based alkaline earth metals, sapphire, crystallized silicon carbide, diamond, potassium bromide, and combinations thereof.

In further embodiments of the present disclosure, including further embodiments of the above exemplary embodiments, the movable lens includes a transparent material comprising refractive index value of approximately 1.3 to approximately 4.

In further embodiments of the present disclosure, including further embodiments of the above exemplary embodiments, the at least one movable lens comprises a thickness of approximately 300 nm to approximately 5,000 μm.

In further embodiments of the present disclosure, including further embodiments of the above exemplary embodiments, the regions comprise at least one layer.

In further embodiments of the present disclosure, including further embodiments of the above exemplary embodiments, each at least one movable lens includes an anti-reflection coating.

In further embodiments of the present disclosure, including further embodiments of the above exemplary embodiments, the at least one lenslet array comprises a piezoelectric transducer configured to move the at least one lenslet array in relation to the backplane.

In further embodiments of the present disclosure, including further embodiments of the above exemplary embodiments, the at least one movable lens comprises one or more controllable lens configured to move individually.

In further embodiments of the present disclosure, including further embodiments of the above exemplary embodiments, the at least one movable lens comprises a controllable array of lens configured to move in plane.

In further embodiments of the present disclosure, including further embodiments of the above exemplary embodiments, the at least one movable lens includes at least one micromechanical structure or at least one actuator, configured to move each lens individually or in plane.

In further embodiments of the present disclosure, including further embodiments of the above exemplary embodiments, the one or more regions comprise a metal or at least one coating.

In further embodiments of the present disclosure, including further embodiments of the above exemplary embodiments, the dielectric comprises a vacuum or an inert gas.

In further embodiments of the present disclosure, including further embodiments of the above exemplary embodiments, the at least one movable lens comprises any one or more of the following transparent materials: zinc sulfide, zinc selenide, fluoride based alkaline earth metals, sapphire, crystallized silicon carbide, diamond, potassium bromide, and combinations thereof.

In further embodiments of the present disclosure, including further embodiments of the above exemplary embodiments, the movable lens includes a transparent material comprising refractive index value of approximately 1.3 to approximately 4.

In further embodiments of the present disclosure, including further embodiments of the above exemplary embodiments, the at least one movable lens comprises a thickness of approximately 300 nm to approximately 5,000 μm.

In further embodiments of the present disclosure, including further embodiments of the above exemplary embodiments, the one or more regions comprise at least one layer.

In further embodiments of the present disclosure, including further embodiments of the above exemplary embodiments, each at least one movable lens includes an anti-reflection coating.

In further embodiments of the present disclosure, including further embodiments of the above exemplary embodiments, fabricating the at least one backplane comprises the following steps: depositing a high emissivity material on at least a portion of a substrate of the at least one backplane; and depositing a reflective material on at least a portion of the high emissivity material.

In further embodiments of the present disclosure, including further embodiments of the above exemplary embodiments, fabricating the at least one backplane comprises the following steps: depositing a reflective material on at least one first region of a substrate of the at least one backplane; and depositing a high emissivity material on at least one second region of the substrate, wherein the at least one first region and the at least one second region do not overlap each other.

In further embodiments of the present disclosure, including further embodiments of the above exemplary embodiments, depositing the reflective material comprises the following steps: patterning a first photoresist mask on the at least one first region; and, depositing the reflective material; and, removing the first photoresist mask.

In further embodiments of the present disclosure, including further embodiments of the above exemplary embodiments, depositing the high emissivity material comprises the following steps: patterning a second photoresist mask on the at least one second region; and, depositing the high emissivity material; and, removing the second photoresist mask.

In further embodiments of the present disclosure, including further embodiments of the above exemplary embodiments, fabricating the optomechanical assembly comprises the following steps: fabricating at least one lens of the at least one lenslet array; disposing at least one actuator in the optomechanical assembly; and disposing each at least one lenslet array in contact each at last one actuator or at least one micro electro mechanical system, in the optomechanical assembly.

In further embodiments of the present disclosure, including further embodiments of the above exemplary embodiments, fabricating comprises one or more of the following lens making techniques: polishing, magnetorheological finishing, injection molding, micromachining, and combinations thereof.

In further embodiments of the present disclosure, including further embodiments of the above exemplary embodiments, micromachining comprises one or more of the following techniques: grayscale lithography, etching, and combinations thereof.

In further embodiments of the present disclosure, including further embodiments of the above exemplary embodiments, fabricating the at least one radiator panel comprises the steps of: disposing and securing the at least one backplane adjacent to the at least one optomechanical assembly; and forming a dielectric between the at least one backplane and the at least one optomechanical assembly.

In further embodiments of the present disclosure, including further embodiments of the above exemplary embodiments, the dielectric comprises a vacuum or an inert gas.

BRIEF DESCRIPTION OF FIGURES

The features of the disclosure believed to be novel and the elements characteristic of the invention are set forth with particularity in the appended claims. The figures are for illustration purposes only and are not drawn to scale. The disclosure itself, however, both as to organization and method of operation, can best be understood by reference to the description of the preferred embodiment(s) which follows, taken in conjunction with the accompanying drawings in which:

DETAILED DESCRIPTION OF THE INVENTION

The embodiments of the present disclosure can comprise, consist of, and consist essentially of the features and/or steps described herein, as well as any of the additional or optional ingredients, components, steps, or limitations described herein or would otherwise be appreciated by one of skill in the art. It is to be understood that all concentrations disclosed herein are by weight percent (wt. %.) based on a total weight of the composition unless otherwise indicated.

The sun can be treated as a distant point source with parallel input sun rays containing solar radiation. The angle of incidence for all rays from the sun is the same over the surface of a radiator panel mounted on a flight vehicle. The present disclosure is directed to an exemplary spatially varied tunable radiator for thermal management. The exemplary radiator panel include a lenslet array disposed opposite a backplane that contains regions of material, such as, but not limited to, reflective, absorptive, emissive and photovoltaic. The exemplary lenslet array may be utilized to focus sunlight to specified regions on the backplane. This backplane may be patterned to have regions exhibiting high reflectivity/low emissivity material(s) and regions exhibiting high absorptance/high emissivity material(s). When solar radiation is focused on the regions of high reflectivity/low emissivity material(s), most incident power may be rejected and thermal energy directed back out to space. In contrast, the regions of high emissivity/high absorptance material(s) may emit thermal radiation, that results in cooling.

Figure 1:
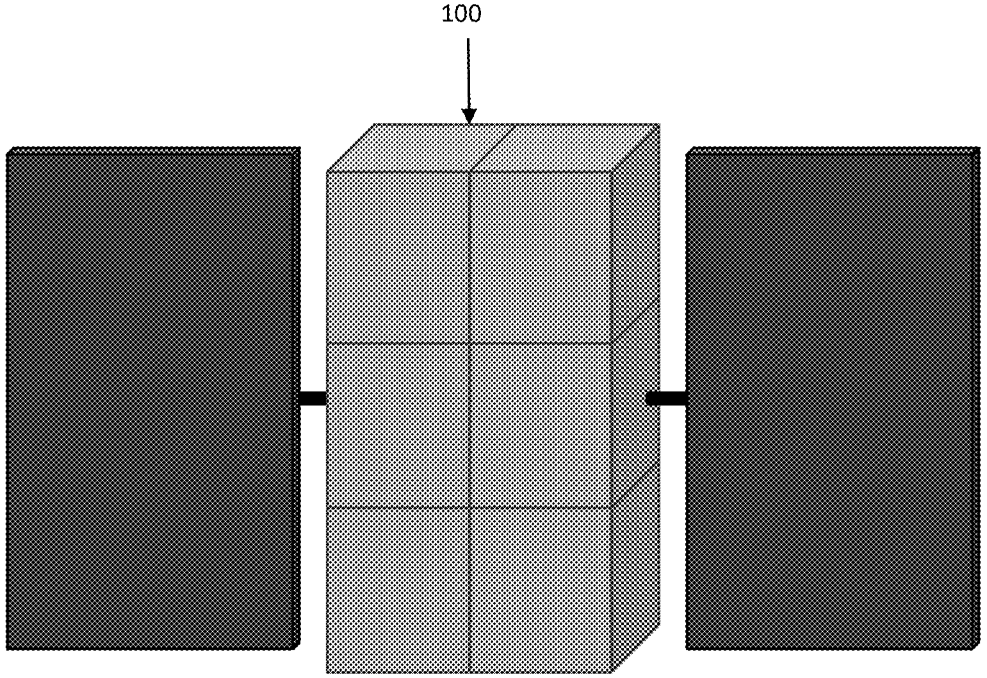
FIG. 1 is an illustration of a six-unit cube satellite.
Figure 2:
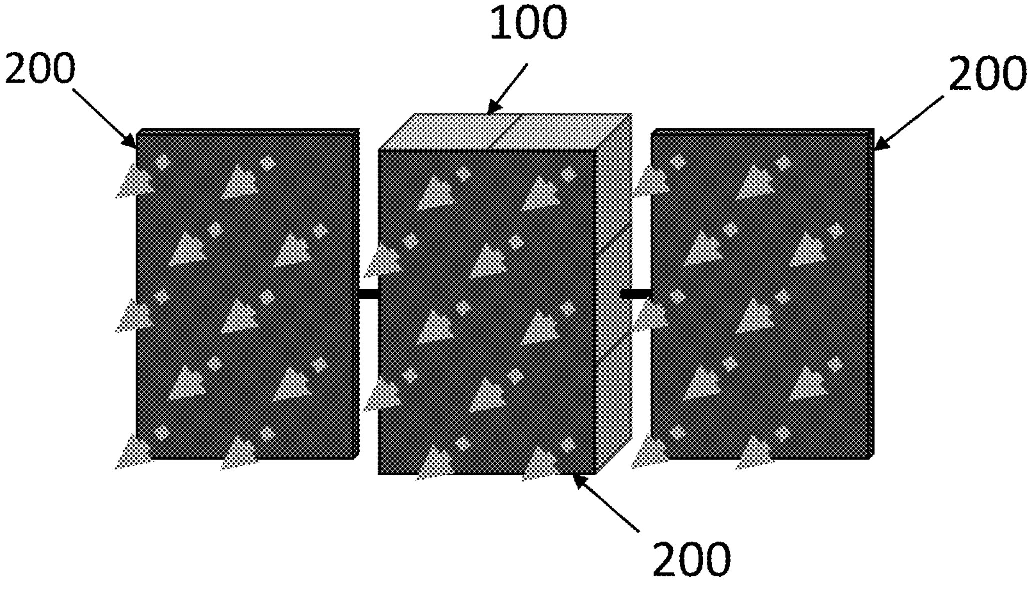
FIG. 2 is an illustration of exemplary radiator panels mounted on the satellite of FIG. 1 and heat radiating from those panels.

Referring now to FIGS. 1 and 2, the exemplary radiator panel disclosed herein may be mounted to the exterior surface of a flight vehicle, e.g., a satellite 100. Suitable satellites 100 may include, but are not limited to, low earth orbit and smaller size satellites. Such suitable satellites may already be equipped with radiator panels 200 mounted to the exterior surface of each unit, e.g., a six-unit cube satellite of FIG. 1. Each mounted radiator panel 200 may possess an exterior surface having a backplane including one or more regions comprising one or more of the following materials: reflective, absorptive, emissive and photovoltaic. These mounted radiator panels 200 may be retrofitted with an exemplary thermal management system disclosed herein. That is, an exemplary thermal management system may be attached to each backplane of each mounted radiator panel (See FIGS. 2 and 3). In general, the exemplary thermal management system may be suitable for various satellite architectures, such as, but not limited to, conformal applications and tile array architectures.

Figure 3:
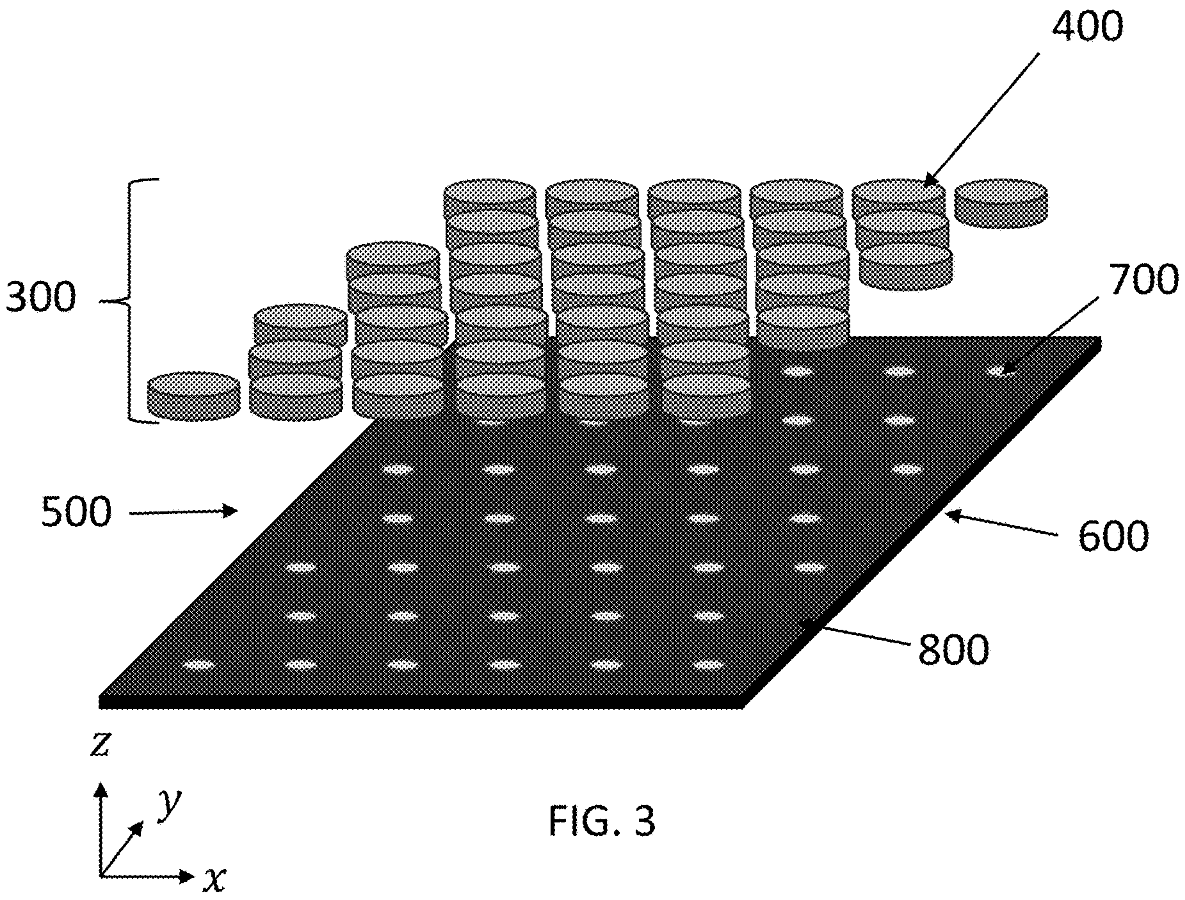
FIG. 3 is an illustration of an exemplary radiator panel of FIG. 2.
Figure 4:
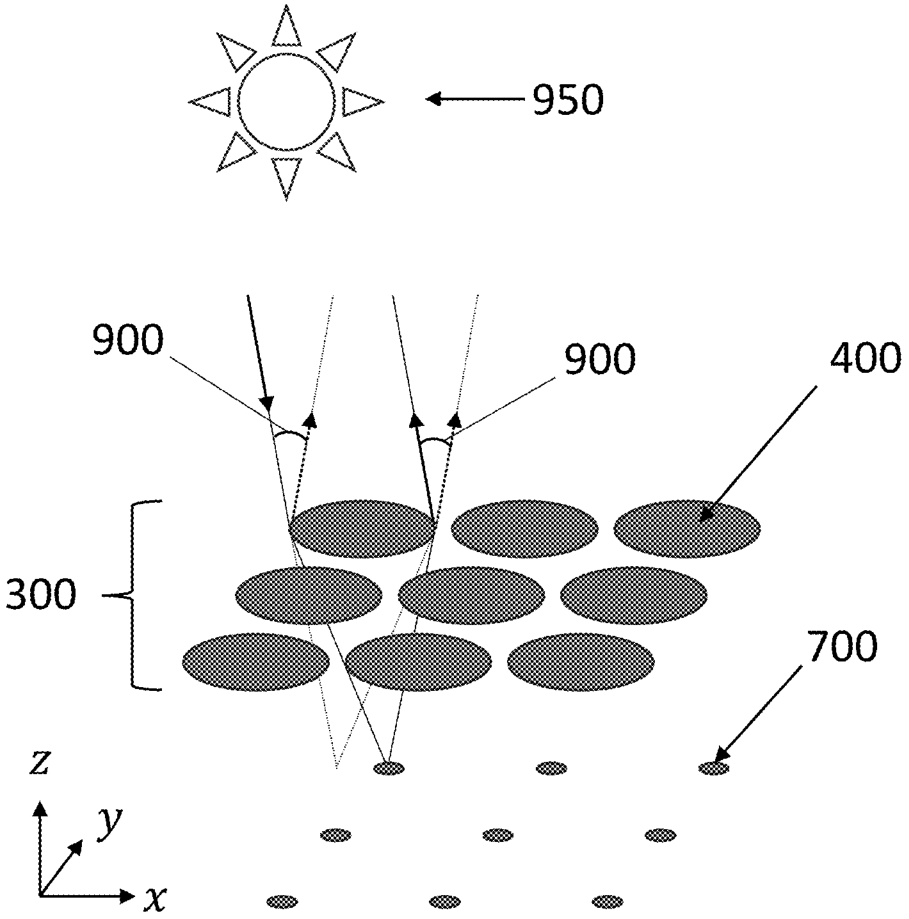
FIG. 4 illustrates thermal radiation emitting into a direction away from the sun using the exemplary radiator panel of FIGS. 2 and 3.
Figure 5:
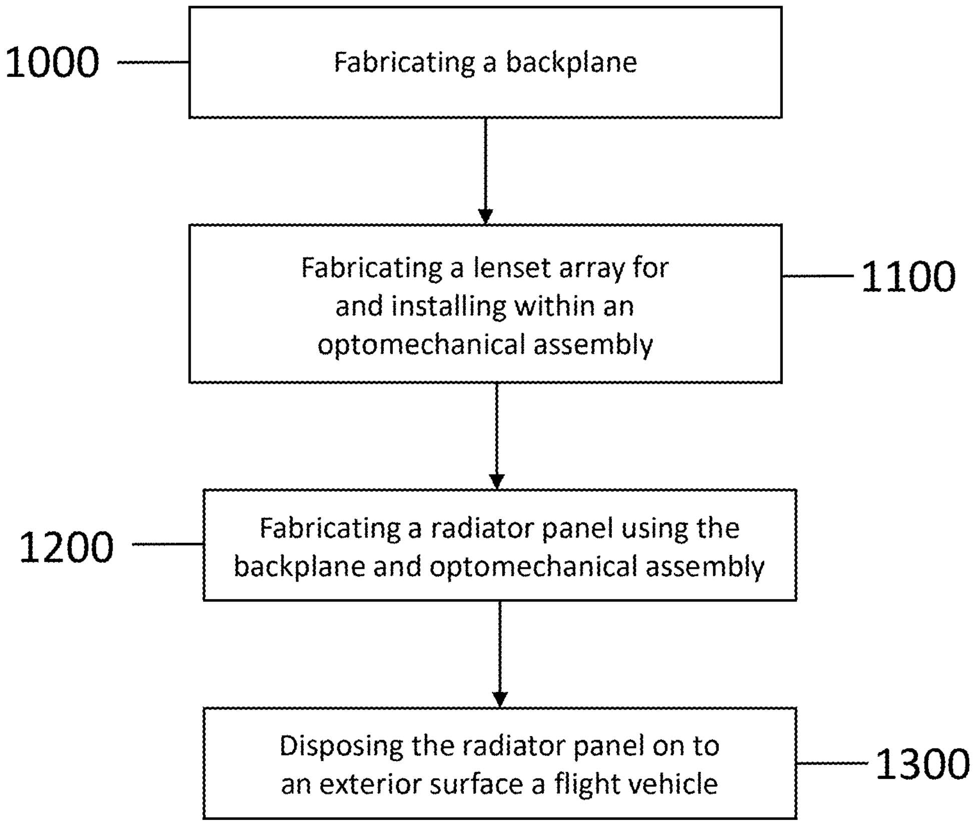
FIG. 5 illustrates a flowchart showing an exemplary process for fabricating the exemplary radiator panel disclosed herein.

Referring now to FIGS. 3-5, each exemplary thermal management system may include at least one optomechanical assembly 300 having a spatially varied tunable lenslet array 400 (see FIG. 2). Each lenslet array may include at least one movable lens disposed in a first plane. Disposed adjacent the first plane, a dielectric 500 may be disposed in a second plane adjacent a third plane where a backplane 600 may be located. The lenslet array and backplane, and first and third planes respectively, are disposed opposite each other. The backplane of a radiator panel may be one layer of a multi-layer laminated structure common to such panel construction.

Using, e.g., piezoelectric transduction by a piezoelectric transducer, the exemplary lenslet array 400 may move in relation to the backplane in response to the incident solar radiation angle(s) 900 change as the satellite changes angle in relation to the sun 950. With respect to movement, the lenslet array 400 may either move in plane, for example, the first plane, or rotate individually to redirect the solar radiation on the backplane. To facilitate such individual movement, each lens may be equipped with an electromechanical structure, for example, an actuator, a spring, a micro electro mechanical system ("MEMS"), combinations thereof, and the like; that may not laterally move as a unit but rather flex or otherwise shift to redirect solar radiation. The backplane 600 acts as a focal plane for each individual lens of the lenslet array. The distance between the backplane 600 and lenslet array 300, and occupied by the dielectric, may be the focal length or distance at which an image of the sun is formed. Each individual lens may work independently as each receives sunlight. The thermal infrared radiation may be utilized alongside sunlight tracking methods, e.g., sensing the direction of incident radiation. Sensing the direction of incident radiation may also be used as a method to actively change the amount of solar energy absorbed by the regions of the backplane to alter the overall temperature of the satellite by varying the heat input from solar radiation. In at least one embodiment, each lens 400 may be composed of a material which may be actively tuned in geometry or optical constants in order to redirect the solar radiation. In particular, the lens material should be transmissive to thermal infrared radiation. More particularly, the lens material may exhibit sufficient transparency over a wide band, that is, all wavelengths. Suitable lens material may exhibit a refractive index high enough to focus light. A suitable refractive index value may be approximately 1.3 to approximately 4. For this reason, suitable lens material may include, but is not limited to, zinc sulfide, zinc selenide, fluoride based alkaline earth metals, sapphire, crystallized silicon carbide, diamond, potassium bromide, combinations thereof, and the like. Further, each lens may exhibit and possess a thickness of approximately 300 nm to approximately 5,000 μm.

The dielectric 500, which occupies the focal length, may be a vacuum or an inert gas. In addition, those materials suitable for the lens as discussed above may also be utilized as the dielectric material. Such dielectric materials may facilitate the transmission of light incident from the sun therethrough and the thermal emission of radiation therefrom. The thickness of the dielectric 500, as well as, selection of vacuum or choice of inert gas, may be sufficient to permit such facilitation.

As mentioned above, the backplane 600 may include first and second regions 700 and 800 exhibiting one or more materials, such as, but not limited to, reflective, absorptive, emissive and photovoltaic. The various regions with different reflection/absorption/emission values may also depend on one or more wavelengths and/or may be graded to facilitate for the smooth tunability of values. Each region may comprise a single layer, multi-layer or meta-material structure. The multi-layer structure may exhibit and possess wide spectral bandwidth, but not necessarily a broadband range. In contrast, the meta-material approach may exhibit and possess the broadband range. With respect to the specific materials, suitable high reflective/low emissive materials may include, but are not limited to, a metal such as silver, gold, aluminum, cadmium, polished nickel, platinum, tungsten, zinc, combinations thereof, and the like. When considering additional suitable high reflective/low emissive materials, materials generally having an emissivity of less than approximately 0.1 and a reflectivity of greater than 0.9 are suitable for use herein. With respect to the high absorptive/high emissive materials, the materials may be textured and not degrade too quickly so that the material may maintain its integrity for the life of the backplane. Suitable high absorptive/high emissive materials may include, but are not limited to, black silicon, oxidized steel, carbon black, quartz, polymer(s), combinations thereof, and the like. When considering additional suitable high absorptive/high emissive materials, materials generally having an emissivity of greater than approximately 0.9 are suitable for use herein.

Referring now to FIG. 6, a flowchart illustrating an exemplary process for fabricating the exemplary radiator panel for a flight vehicle disclosed herein is shown. At an exemplary step 1000 of FIG. 6, a backplane 600 may be fabricated. In at least one embodiment, a reflective material may be deposited on at least one first region 700 of a substrate of the backplane 600. Next, a high emissivity material may be deposited on at least one second region 800 of the substrate of the backplane 600. As shown in FIG. 2, the first region 700 containing the reflective material and the second region 800 containing the high emissivity material do not overlap each other. Any deposition technique capable of depositing either the reflective material or the high emissivity material onto the substrate may be utilized. Suitable deposition techniques may include, but are not limited to, an etch back method, a liftoff method utilizing a photoresist mask, combinations thereof, and the like. In at least one other embodiment, the high emissivity material may be deposited on at least a portion of the substrate of the backplane 600. Afterwards, a reflective material may be deposited on at least a portion of the high emissivity material. In either embodiment, the resultant backplane 600 may have regions 700, 800 containing the reflective material, high emissivity material or any other combination of materials disclosed herein.

Next, at an exemplary step 1100 of FIG. 6, an optomechanical assembly including at least one lenslet array 300 may be fabricated. In at least one embodiment, at least one lens 400 may be fabricated. Any lens making technique capable of fabricating a lens is suitable for use herein. Suitable lens making techniques may include, but are not limited to, polishing, magnetorheological finishing, injection molding, micromachining, combinations thereof, and the like. And, in particular, suitable micromachining techniques may include, but are not limited to, grayscale lithography, etching, combinations thereof, and the like. Next, for each lens 400 of the lenslet array 300, at least one mechanical device (not shown), e.g., a spring, an actuator, a MEMS, combinations thereof, and the like; may be installed within the optomechanical assembly. Lastly, each lens 400 may be disposed in contact and secured to each mechanical device within the optomechanical assembly.

Next, at an exemplary step 1200 of FIG. 6, the backplane 600 and optomechanical assembly containing the lenslet array 300 including the lens 400 and mechanical devices (not shown) may be assembled to form the exemplary radiator panel 200 disclosed herein. The backplane 600 and optomechanical assembly may be disposed adjacent each other such that the optomechanical assembly occupies a first plane and the backplane 600 occupies a third plane. By disposed adjacent each other, the backplane 600 and optomechanical assembly may be secured using any suitable technique. After the optomechanical assembly of the first plane and the backplane 600 of the third plane are secured, a second plane, that is, an unoccupied spatial area containing air, may be formed between the first and third planes. Next, a dielectric 500 may be formed and occupy the second plane. In at least one embodiment, the air contained within the aforementioned unoccupied spatial area may be evacuated to form a vacuum therein. In at least one other embodiment, the resultant vacuum may be filled with an inert gas. In either embodiment, either the vacuum or the inert gas may serve effectively as a dielectric material suitable for use in the exemplary radiator panel disclosed herein.

Lastly, at an exemplary step 1300 of FIG. 6, the exemplary radiator panel 200 may be disposed onto an exterior surface of a flight vehicle as illustrated in FIG. 2. The radiator panel 200 may be secured to the flight vehicle using any suitable technique.

Various potential alternative embodiments may be contemplated. For example, in at least one embodiment, the high reflective/low emissive materials disclosed herein may be substituted with a photovoltaic material. The photovoltaic material may act as a solar cell and produce electricity for use by the satellite or other suitable flight vehicle. By combining the solar cell and radiator panel into a single system, both the overall size and weight may be reduced. The exemplary thermal management system disclosed herein creates movement of the lenslet array at the microsystem level such that entire radiator panels are not required to move, that is, rotate, deploy, etc., to reduce solar loading. As a result, the additional weight associated with energy storage, consumption and transmission components, movable parts and motor(s) is eliminated. The exemplary thermal management system may provide active tunability to vary the absorptive properties of the radiator panel and minimize the temperature fluctuation of the radiator panel and flight vehicle. The exemplary thermal management system also may reduce solar loading and may decrease both the heat load and system temperature of the radiation panel and flight vehicle. By lowering the system temperature, the performance of the on-board electronics of the flight vehicle is improved.

While the present disclosure has been particularly described, in conjunction with specific preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present disclosure.

What is claimed is:

1. A radiator panel of a flight vehicle, comprising:
- an optomechanical assembly including at least one lenslet array having at least one movable lens disposed in a first plane;
- a dielectric disposed in a second plane adjacent the first plane;
- a backplane disposed in a third plane adjacent the second plane and opposite the first plane, the backplane including one or more regions comprising one or more of the following materials: reflective, absorptive, emissive and photovoltaic.

2. The radiator panel of claim 1, wherein the at least one lenslet array comprises a piezoelectric transducer configured to move the at least one lenslet array in relation to the backplane.

3. The radiator panel of claim 1, wherein the at least one movable lens comprises one or more controllable lens configured to move individually.

4. The radiator panel of claim 1, wherein the at least one movable lens comprises a controllable array of lens configured to move in plane.

5. The radiator panel of claim 1, wherein the at least one movable lens includes at least one micromechanical structure or at least one actuator, configured to move each lens individually or in plane.

6. The radiator panel of claim 1, wherein one or more regions comprise a metal or at least one coating.

7. The radiator panel of claim 1, wherein the dielectric comprises a vacuum or an inert gas.

8. The radiator panel of claim 1, wherein the at least one movable lens comprises any one or more of the following transparent materials: zinc sulfide, zinc selenide, fluoride based alkaline earth metals, sapphire, crystallized silicon carbide, diamond, potassium bromide, and combinations thereof.

9. The radiator panel of claim 1, wherein the movable lens includes a transparent material comprising refractive index value of approximately 1.3 to approximately 4.

10. The radiator panel of claim 1, wherein the at least one movable lens comprises a thickness of approximately 300 nm to approximately 5,000 μm.

11. The radiator panel of claim 1, wherein the regions comprise at least one layer.

12. The radiator panel of claim 1, wherein each at least one movable lens includes an anti-reflection coating.

13. A flight vehicle, comprising:
- at least one radiator panel comprising:
- an optomechanical assembly including a lenslet array having at least one movable lens disposed in a first plane;
- a dielectric disposed in a second plane adjacent the first plane;
- a backplane disposed in a third plane adjacent the second plane and opposite the first plane, the backplane including one or more regions comprising one or more of the following materials: reflective, absorptive, emissive and photovoltaic.

14. The flight vehicle of claim 13, wherein the at least one lenslet array comprises a piezoelectric transducer configured to move the at least one lenslet array in relation to the backplane.

15. The flight vehicle of claim 13, wherein the at least one movable lens comprises one or more controllable lens configured to move individually.

16. The flight vehicle of claim 13, wherein the at least one movable lens comprises a controllable array of lens configured to move in plane.

17. The flight vehicle of claim 13, wherein the at least one movable lens includes at least one micromechanical structure or at least one actuator, configured to move each lens individually or in plane.

18. The flight vehicle of claim 13, wherein the one or more regions comprise a metal or at least one coating.

19. The flight vehicle of claim 13, wherein the dielectric comprises a vacuum or an inert gas.

20. The flight vehicle of claim 13, wherein the at least one movable lens comprises any one or more of the following transparent materials: zinc sulfide, zinc selenide, fluoride based alkaline earth metals, sapphire, crystallized silicon carbide, diamond, potassium bromide, and combinations thereof.

21. The flight vehicle of claim 13, wherein the movable lens includes a transparent material comprising refractive index value of approximately 1.3 to approximately 4.

22. The flight vehicle of claim 13, wherein the at least one movable lens comprises a thickness of approximately 300 nm to approximately 5,000 μm.

23. The flight vehicle of claim 13, wherein the one or more regions comprise at least one layer.

24. The flight vehicle of claim 13, wherein each at least one movable lens includes an anti-reflection coating.

* * * * *